This invention relates to solenoid-controlled pilot-operated diaphragm valves such as are employed for example in controlling the flow of water in domestic clothes washers and dishwashers.

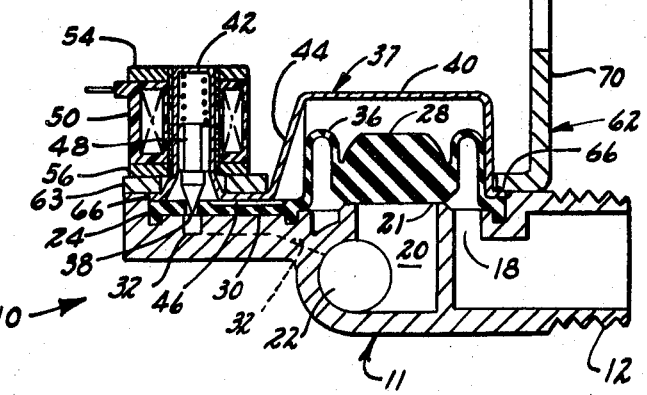
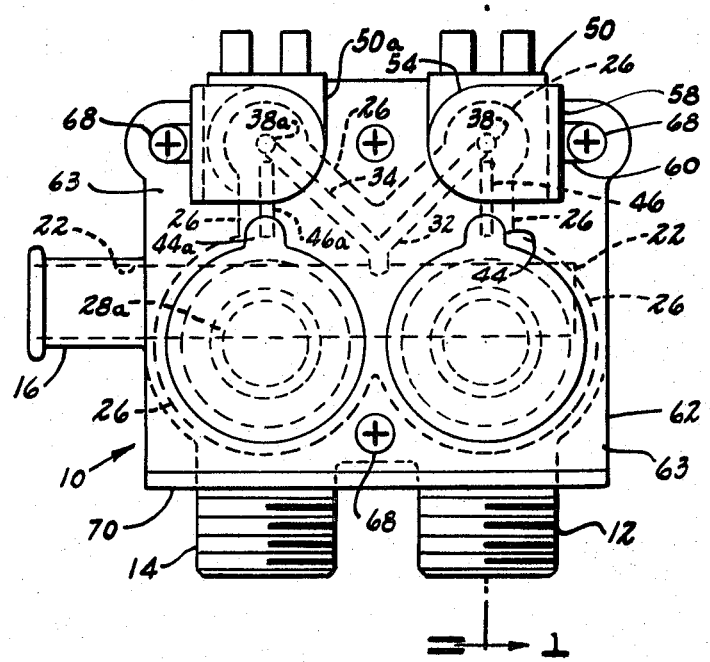
INVENTOR.
JAMES A. KOZEL
BY
JOHN E. McRAE
ATTORNEY 3,300,175
PILOT-OPERATED VALVE
James A. Kozel, Franklin, Mich., assignor to American Radiator & Standard Sanitary Corporation, New York, N.Y., a corporation of Delaware
Filed Oct. 20, 1964, Ser. No. 405,217
4 Claims. (Cl. 251—30)

One object of the invention is to provide a solenoid-controlled pilot-operated diaphragm valve which can be manufactured at relatively low cost.

Another object is to provide a solenoid-controlled pilot-operated diaphragm valve wherein the solenoid armature operates against a fixed pilot port, whereby the armature can have a fairly short stroke without interfering with the motion of the diaphragm.

A further object is to provide a solenoid-controlled pilot-operated diaphragm valve wherein the solenoid armature is controlled by a relatively small low cost solenoid coil.

A still further object is to provide a solenoid-controlled pilot-operated diaphragm valve wherein a relatively low cost metal stamping is employed to house the solenoid armature and diaphragm.

Other objects of this invention will appear from the following description and appended claims, reference being had to the accompanying drawings forming a part of this specification wherein like reference characters designate corresponding parts in the several views.

In the drawings:
FIGURE 1 is a sectional view taken on line 1—1 in FIG. 2 illustrating a valve embodying the invention.
FIG. 2 is a top plan view of the valve illustrated in FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a mixing valve 10 for admitting streams of hot and cold water to the tub of a domestic clothes washing machine. Molded body 11 of the valve is provided with a hot water inlet at 12, a cold water inlet at 14, and a common outlet at 16. Hot inlet 12 includes an annular passage or chamber 18 which terminates at the upper face of the valve body in surrounding relation to an outlet passage or chamber 20 which extends downwardly to a horizontal outlet chamber or passage 22. Cold inlet 14 connects with outlet passage 22 by a passage system which is similar to the system defined by passages 18 and 20.

Overlying the two passage systems is an elastomeric sealing element 24 which has a peripheral outline generally designated by dotted line 26. The sealing element is configured to include two diaphragm portions 28 and 28a overlying respective ones of the annular inlet passages, and flat portions 30 overlying two pilot channel passages or grooves 32 and 34. Each diaphragm portion 28 or 28a is provided with a bleed opening 36, and each flat portion 30 is provided with a pilot port 38 or 38a communicating with respective ones of channels 32 and 34. These channels are formed as grooves in the upper face of body 11 and discharge to outlet chamber 22.

A cover in the form of a metal stamping 37 overlies element 24. As shown in FIG. 1, the cover includes hollow cup portions 40 and 40a overlying diaphragms 28 and 28a, and hollow tubular portions 42 overlying ports 38 and 38a. The two corresponding cover portions communicate with one another via bulged portions 44 and 44a in cup portion 40 and grooves 46 and 46a in the elastomeric element 24.

It will be seen that when port 38 is open fluid can flow from bleed opening 36 into groove 46, through port 38, into channel 32 and thence into outlet passage 22. When port 38 is closed fluid is trapped above diaphragm 28 to move same to a position closing the main valve seat 21 between passages 18 and 20.

Port 38 is opened and closed by a plunger type armature 48 which operates within tubular guide portion 42. A solenoid coil 50 cooperates with a magnetic frame to operate the armature. As shown, the frame is of C-shaped configuration, comprising an upper wall 54, a lower wall 56, and an interconnecting wall 58. A tab 60 is struck out from wall 58 to mount the frame on a cover retainer plate 62. The construction of solenoid coil 50 is duplicated for coil 50a.

Retainer plate 62 includes a horizontal flat portion 63 which is apertured to fit around cup portions 40 and 40a and tubular portions 42 of cover 37. The cover is provided with a peripheral flange 66 which underlies portions of plate 62 to permit the plate to exert a clamping pressure on the cover and elastomeric element 24 when headed screws 68 are threaded into openings in valve body 11. Two of the screws also act as securement devices for the frames of the solenoids. Preferably the periphery of sealing element 24 is vertically thickened, and the upper face of valve body 11 is grooved to provide an improved sealing action when screws 68 are tightened down on retainer plate 62. Preferably the plate is provided with an upturned portion 70 for mounting the valve on a fixed support such as the frame of a domestic clothes washer.

It will be noted that the complete valve has relatively few parts, comprising principally the molded valve body 11, one piece elastomeric element 24, a single stamped cover 37, a single retainer plate 62, and the two solenoid coil assemblies. Assembly operations are facilitated by the fact that all of the components can be inserted from the same side of the valve body.

It will also be noted that armature 48 can have a relatively short stroke to open and close port 38, while diaphragm 28 can enjoy the longer motion necessary to open and close the main valve seat. Because of its short stroke the armature can be operated by a relatively small low cost solenoid coil. The smallness of the coil and its disposition alongside cup portion 40 of the cover is also advantageous in reducing the vertical dimension of the valve assembly.

What is claimed is:
1. In combination: a valve body having an inlet chamber including a first passage terminating at one face of the body, an outlet chamber including a second passage initiating at said face whereby to cooperate with the first passage in defining a main valve seat; an elastomeric element having a first peripheral seal portion lying against said valve body face and a second movable diaphragm portion overlying the first and second passages, said diaphragm portion having a bleed opening in an area thereof communicating with the first passage; a hollow peripherally flanged cover overlying the elastomeric element with its flange seated on the peripheral seal portion; said valve body having a pilot passage initiating in a portion of said valve body face circumscribed by the seal portion and terminating in said outlet chamber; an armature disposed within the cover to open and close said pilot passage; a solenoid coil disposed on the cover to operate the armature; and a cover retainer plate clamped to the valve body with portions thereof overlying the cover flange; said cover being contoured to conduct pilot fluid from the diaphragm bleed opening to the pilot passage; said cover including a first cup portion overlying the diaphragm portion, and a second tube portion accommodating the armature; said cup and tube portions individually projecting from the cover flange in spaced parallelism with one another.

2. In combination: a valve body having an inlet chamber including a first passage terminating at one face of the body, an outlet chamber including a second passage initiating at said face whereby to cooperate with the first passage in defining a main valve seat; a pilot flow groove formed in said one face in communication with said outlet chamber; an elastomeric element having a first generally flat seal portion overlying the flow groove, and a second diaphragm portion overlying the valve seat; a bleed passage arranged to feed pilot fluid from the first passage to the face of the diaphragm remote from the valve seat, and a pilot port formed in the seal portion of the elastomeric element to admit fluid to the flow groove; a hollow peripherally flanged cover overlying the elastomeric element with its flange seated on the peripheral face area of the element; a cover retainer plate clamped to the valve body with portions thereof overlying the cover flange; an armature disposed within the cover in registry with the pilot port; and a solenoid coil disposed on the cover to operate the armature.

3. In combination: a valve body having an inlet chamber including a first passage terminating at one face of the body, an outlet chamber including a second passage initiating at said face whereby to cooperate with the first passage in defining a main valve seat; a pilot flow channel formed in said one face in communication with said outlet chamber; an elastomeric element having a first seal portion overlying the flow channel, and a second diaphragm portion overlying the valve seat; said element having a bleed opening in an area of the diaphragm portion communicating with the first passage, and a pilot port communicating with the flow channel; a hollow peripherally flanged cover overlying the elastomeric element with its flange seated on the peripheral face area of the element; a cover retainer plate clamped to the valve body with portions thereof overlying the cover flange; an armature disposed within the cover in registry with the pilot port; and a solenoid coil disposed on the cover to operate the armature; said cover consisting of a one piece metal stamping having a first cup portion overlying the diaphragm portion, and a second tube portion accommodating the armature; said cup and tube portions individually projecting from the cover flange in spaced parallelism with one another.

4. In combination: a valve body having an inlet chamber including an annular passage terminating at one face of the body, an outlet chamber including a passage concentrically disposed within the annular passage to cooperate therewith in defining an annular main valve seat; a pilot flow groove formed in said one face of the valve body in communication with said outlet chamber; an elastomeric element positioned on said valve body face, including a diaphragm portion overlying the annular valve seat, and a generally flat seal portion overlying the pilot flow groove; said flat portion having a pilot port in direct registry with said groove, and said diaphragm portion having a bleed opening communicating with the annular passage; a peripherally flanged one piece cover having its flange seated on the peripheral area of the elastomeric element; said cover including a first cup portion defining a first recess overlying the diaphragm portion, and a second tubular portion defining a second recess overlying the pilot port; an armature plunger disposed within the second recess for movement toward and away from the pilot port; an electric coil surrounding the tubular portion for moving the armature; and a cover retainer plate clamped to the valve body with portions thereof overlying the peripheral flange of the cover.

References Cited by the Examiner
UNITED STATES PATENTS

| | | | |
|---|---|---|---|
| 1,964,921 | 7/1934 | Lundberg | 251—45 XR |
| 2,946,551 | 7/1960 | Kovach | 251—30 |
| 2,951,503 | 9/1960 | Windsor | 251—45 XR |

FOREIGN PATENTS

| | | |
|---|---|---|
| 914,710 | 6/1946 | France. |
| 813,916 | 5/1959 | Great Britain. |

M. CARY NELSON, *Primary Examiner.*

W. JOHNSON, *Assistant Examiner.*